(12) United States Patent
Mueller et al.

(10) Patent No.: US 12,415,149 B2
(45) Date of Patent: Sep. 16, 2025

(54) WASTEWATER HEAT EXCHANGE SYSTEM (71) Applicant: SHARC Energy Systems Inc., Port Coquitlam (CA)

(72) Inventors: Lynn Mueller, Richmond (CA); Brett Stewart, North Vancouver (CA); Brock Trimble, Maple Ridge (CA); Matthew Wardlow, Chilliwack (CA); Taha Yousefinia, Coquitlam (CA)

(73) Assignee: SHARC Energy Systems Inc., Port Coquitlam (CA)

( * ) Notice: Subject to any disclaimer, the term of this patent is extended or adjusted under 35 U.S.C. 154(b) by 145 days.

(21) Appl. No.: 17/950,842

(22) Filed: Sep. 22, 2022

(65) Prior Publication Data
US 2023/0405500 A1 Dec. 21, 2023

Related U.S. Application Data (63) Continuation of application No. PCT/CA2022/050832, filed on May 25, 2022.

(51) Int. Cl.
*B01D 36/04* (2006.01)
*B01D 21/06* (2006.01)
(Continued)

(52) U.S. Cl.
CPC ............ *B01D 36/04* (2013.01); *B01D 21/06* (2013.01); *B01D 29/35* (2013.01);
(Continued)

(58) Field of Classification Search
None
See application file for complete search history.

(56) References Cited

U.S. PATENT DOCUMENTS

| 781,039 A | * | 1/1905 | Weabe | B01D 29/05 |
| | | | | 210/414 |
| 989,975 A | * | 4/1911 | Holt | B01D 35/02 |
| | | | | 210/415 |

(Continued)

FOREIGN PATENT DOCUMENTS

| CA | 2926576 C | 6/2020 |
| CN | 112044147 A | 12/2020 |

(Continued)

OTHER PUBLICATIONS

Sharc Energy Systems Inc., International Patent Application No. PCT/CA2022/050832, International Search Report and Written Opinion, Feb. 15, 2023.

(Continued)

*Primary Examiner* — Robert J Popovics
(74) *Attorney, Agent, or Firm* — Moore & Van Allen PLLC; Jeffrey R. Gray (57) ABSTRACT An apparatus for wastewater filtration having a barrel, a basket and a screw on a shaft rotating therein for pushing solid in a distinct output. A removable cartridge comprises a cover for the barrel, the cartridge comprising a pre-sealed shaft connector which releasably connects to at least the upper shaft portion or the lower shaft portion to form the shaft. The screw comprises a brush on an outer rim thereof, the brush having radially outwardly oriented bristles that scrape an inner surface of the basket. The screw comprises a winged wiper at a bottom thereof for sweeping a bottom surface of the barrel, and the solid-material output is provided at the bottom surface of the barrel and is shaped as a rectangular opening which is offset from a central axis of the screw. Solid removal efficiency and maintenance are thereby improved.

22 Claims, 7 Drawing Sheets (51) Int. Cl.
*B01D 29/35* (2006.01)
*B01D 29/64* (2006.01)

(52) U.S. Cl.
CPC ...... *B01D 29/6476* (2013.01); *B01D 29/6415* (2013.01); *B01D 2201/08* (2013.01)

(56) References Cited

U.S. PATENT DOCUMENTS

| | | | | |
|---|---|---|---|---|
| 1,046,679 | A * | 12/1912 | Thoma | B01D 29/56 |
| | | | | 210/418 |
| 1,466,499 | A * | 8/1923 | Fletcher | D21C 9/10 |
| | | | | 366/314 |
| 1,510,863 | A * | 10/1924 | Rose | B01D 29/6415 |
| | | | | 210/414 |
| 1,772,262 | A * | 8/1930 | Naugle | B01D 29/828 |
| | | | | 210/488 |
| 2,125,532 | A * | 8/1938 | Wells | B01D 29/118 |
| | | | | 210/414 |
| 2,408,741 | A * | 10/1946 | Dodge | B01D 29/356 |
| | | | | 210/355 |
| 2,678,732 | A * | 5/1954 | Banks | B01D 29/6476 |
| | | | | 210/414 |
| 3,126,818 | A * | 3/1964 | Koelsch | B30B 9/121 |
| | | | | 100/150 |
| 3,379,312 | A * | 4/1968 | Brown | B01D 35/147 |
| | | | | 210/457 |
| 3,695,173 | A * | 10/1972 | Cox | B30B 9/12 |
| | | | | 210/414 |
| 3,739,915 | A * | 6/1973 | Kehoe | B01D 29/118 |
| | | | | 210/399 |
| 3,959,140 | A * | 5/1976 | Legras | B01D 29/94 |
| | | | | 210/489 |
| 4,003,837 | A * | 1/1977 | Osborne | B01D 29/6476 |
| | | | | 241/43 |
| 4,041,854 | A * | 8/1977 | Cox | B30B 9/12 |
| | | | | 100/145 |
| 4,260,488 | A | 4/1981 | Condolios | |
| 4,464,253 | A * | 8/1984 | Kuri | B01D 29/60 |
| | | | | 210/414 |
| 4,871,449 | A | 10/1989 | Lott | |
| 5,562,758 | A * | 10/1996 | Awaji | B01D 46/681 |
| | | | | 55/300 |
| 5,597,076 | A * | 1/1997 | Kershner | B07B 4/06 |
| | | | | 209/616 |
| 7,335,311 | B2 | 2/2008 | Christophersson | |
| 9,404,135 | B2 * | 8/2016 | Genta | C10L 9/086 |
| 10,646,801 | B2 * | 5/2020 | Tameroglu | B01D 29/6415 |
| 12,274,962 | B2 * | 4/2025 | Eisen | B01D 29/606 |
| 2011/0011283 | A1 | 1/2011 | Burke | |
| 2011/0110810 | A1 | 5/2011 | Burke | |
| 2015/0196859 | A1 | 7/2015 | Levitt | |
| 2016/0368781 | A1 * | 12/2016 | Mueller | B01D 1/0058 |
| 2022/0219101 | A1 * | 7/2022 | Sabol | B01D 29/94 |
| 2023/0405500 | A1 * | 12/2023 | Mueller | B01D 21/06 |
| 2024/0173655 | A1 * | 5/2024 | Vaidhyanathan | D06F 39/10 |
| 2024/0353047 | A1 * | 10/2024 | Chung | B01D 35/16 |
| 2024/0399275 | A1 * | 12/2024 | Okuno | B01D 29/11 |

FOREIGN PATENT DOCUMENTS

| | | |
|---|---|---|
| CN | 112076519 A | 12/2020 |
| CN | 113772911 A | 12/2021 |

OTHER PUBLICATIONS

Sharc Energy Systems Inc., European Patent Application No. 22182844.5, Extended European Search Report, Dec. 16, 2022.

* cited by examiner

WASTEWATER HEAT EXCHANGE SYSTEM

CROSS REFERENCE AND PRIORITY CLAIM UNDER 35 U.S.C. § 119

The present application for a patent claims priority to PCT Application No. CA2022/050832 entitled "WASTEWATER HEAT EXCHANGE SYSTEM," filed on May 25, 2022 and assigned to the assignees hereof and hereby expressly incorporated by reference herein.

BACKGROUND

(a) Field

The subject matter disclosed generally relates to wastewater treatment. More specifically, it relates to an apparatus to remove solid residue from a wastewater stream which is consistent with heat extraction, with easier maintenance.

(b) Related Prior Art

Waste heat recovery is a sustainable source of recovered energy, with waste processing and waste streams such as municipal sewage being widely distributed. The primary challenges in the widespread adoption of waste heat recovery is to efficiently separate out particulate sufficient for a cleaned stream to be used in heat extraction systems, where an acceptable waste content level is desirable. Various filtration systems have been exploited for this purpose. One major drawback with traditional filtration systems however, is having open waste extraction, leaks and frequent maintenance and limited continuous control of output waste content. Filtration systems for inline continuous separation of particulate from waste stream conventionally require manual intervention to scrape and remove waste, solids and obstructions. A review of relevant control systems in waste filtration are described.

Augers and screws have commonly been used in extractors, compactors and presses, including sometimes fit within filter sleeves or meshes such that water can flow out of the mesh and be separated. Such applications with high viscosity are only tangentially applicable but included for completeness of alternative examples. Examples of some of these designs are shown in U.S. Pat. Nos. 4,260,488, 4,871,449, and published applications 20110011283, 2011110810. Several of these use a variable speed motor to drive the auger but the auger in the examples above is the primary "driver" of removing the waste or heavier sludge in some cases, as discussed in more detail below.

There have been some approaches for feedback control of waste stream filtering, but limited in utility for waste stream continuous filtering. An apparatus for treating sludge is disclosed in U.S. Pat. No. 7,335,311, having a feedback control of the variable speed auger motor which is adjusted to control the flow of sludge out of the system (sludge is much more viscous than waste water and a press for sludge removal or dewatering is a different application but is included for completeness as an auger based system with control). The variable speed motor adjusts auger speed to control the waste flow rate in response to torque on the drive shaft, sludge content or pressure in the sludge. Such as system would not be useful or applicable for high rate continuous waste water filtration, as the press does not provide filtering out a small amount of waste content at high flow rates to provide a low waste content stream but compressing solid sludge waste for removal. Varying the auger speed is the primary "driver" with limited control range for low waste content streams.

A patent publication, US20110011283, has a variable speed motor with the auger speed responding to either an upstream feedstock piston actuator (rate of feed) or a second stage compression piston (rate of compacting). The control feedback is limited to the application process for feedstock processing—maintaining a rate of feed of a compacted feed. In applications such as sewage lines there is a need to respond to incoming flow rates which may not be adjustable. Also this system maintains a feed rate for efficiency but does not provide feedback control determined by outgoing filtered water waste content level.

Few relevant examples were found for waste stream filtration with dynamic control of waste content level suitable for heat recovery systems. There is a need for a system with continuous dynamic extraction of waste from a waste stream in a closed loop sealed system, maintaining waste content level suitable for heat recovery.

Especially, past attempts, such as described in Canadian patent 2926576, incorporated herein by reference, have shown good improvements in terms of precision control of waste extraction from a waste stream at low content levels. However, maintenance can be hard to perform. Hence, there is a need to improve the ability to perform maintenance and to ease cleaning of the apparatus.

SUMMARY

The present disclosure relates to a wastewater filtration system such as one which is appropriate incorporating heat recovery from a waste stream. It comprises features, such as a removable cartridge with distinct and connectable (and reconnectable) shaft portions, where there is at least one shaft portion being pre-sealed within the cartridge for fast removal and reinstallation. The screw in the apparatus comprises a brush for improved scraping of the basket. A wiper at the bottom is associated with an offset rectangular opening for solid-material output. This configuration is more efficient for self-cleaning during operation and allows for an easier maintenance of the apparatus.

According to an aspect of the disclosure, there is provided an apparatus for wastewater filtration, comprising:
  a barrel forming an enclosure and having an input for an incoming wastewater stream, and output for an outgoing filtered wastewater stream, and a solid-material output;
  a basket in barrel which is perforated and provided in the enclosure of the barrel, between the input and the output;
  a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion;
  a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel.

According to an embodiment, the shaft connector is integral with the upper shaft portion.

According to an embodiment, the shaft connector is distinct from the upper shaft portion.

According to an embodiment, the screw is an auger screw.

According to an embodiment, the auger screw comprises a winged wiper at a bottom thereof for sweeping a bottom surface of the barrel.

According to an embodiment, the solid-material output is provided at the bottom surface of the barrel and is shaped as a rectangular opening which is offset from a central axis of the screw.

According to an embodiment, the auger screw comprises a brush on an outer rim thereof, the brush having radially outwardly oriented bristles that scrape an inner surface of the basket.

According to an embodiment, the basket comprises a flange on an upper rim thereof to ease a removal thereof from the barrel.

According to an embodiment, the input for the incoming wastewater stream is located higher than the output for the outgoing filtered wastewater stream.

According to another aspect of the disclosure, there is provided an apparatus for wastewater filtration, comprising:
  a barrel forming an enclosure and having an input for an incoming wastewater stream, and output for an outgoing filtered wastewater stream, and a solid-material output;
  a basket in barrel which is perforated and provided in the enclosure of the barrel, between the input and the output;
  a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion, the screw comprising a brush on an outer rim thereof, the brush having radially outwardly oriented bristles that scrape an inner surface of the basket.

According to an embodiment, there is further provided a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel.

According to an embodiment, the shaft connector is integral with the upper shaft portion.

According to another embodiment, the shaft connector is distinct from the upper shaft portion.

According to an embodiment, the screw comprises a winged wiper at a bottom thereof for sweeping a bottom surface of the barrel.

According to an embodiment, the solid-material output is provided at the bottom surface of the barrel and is shaped as a rectangular opening which is offset from a central axis of the screw.

According to an embodiment, the basket comprises a flange on an upper rim thereof to ease a removal thereof from the barrel.

According to an embodiment, the input for the incoming wastewater stream is located higher than the output for the outgoing filtered wastewater stream.

According to another aspect of the disclosure, there is provided an apparatus for wastewater filtration, comprising:
  a barrel forming an enclosure and having an input for an incoming wastewater stream, and output for an outgoing filtered wastewater stream, and a solid-material output;
  a basket in barrel which is perforated and provided in the enclosure of the barrel, between the input and the output;
  a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion, wherein the screw comprises a winged wiper at a bottom thereof for sweeping a bottom surface of the barrel, wherein the solid-material output is provided at the bottom surface of the barrel and is shaped as a rectangular opening which is offset from a central axis of the screw.

According to an embodiment, there is further provided a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel.

According to an embodiment, the shaft connector is integral with the upper shaft portion.

According to an embodiment, the shaft connector is distinct from the upper shaft portion.

According to an embodiment, the screw comprises a brush on an outer rim thereof, the brush having radially outwardly oriented bristles that scrape an inner surface of the basket.

According to an embodiment, the basket comprises a flange on an upper rim thereof to ease a removal thereof from the barrel.

According to an embodiment, the input for the incoming wastewater stream is located higher than the output for the outgoing filtered wastewater stream.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The invention relates to fluid filtration systems. In particular, this invention relates to a waste filtration system. The invention is best suited for the filtration of waste streams for heat recovery.

Figure 4:
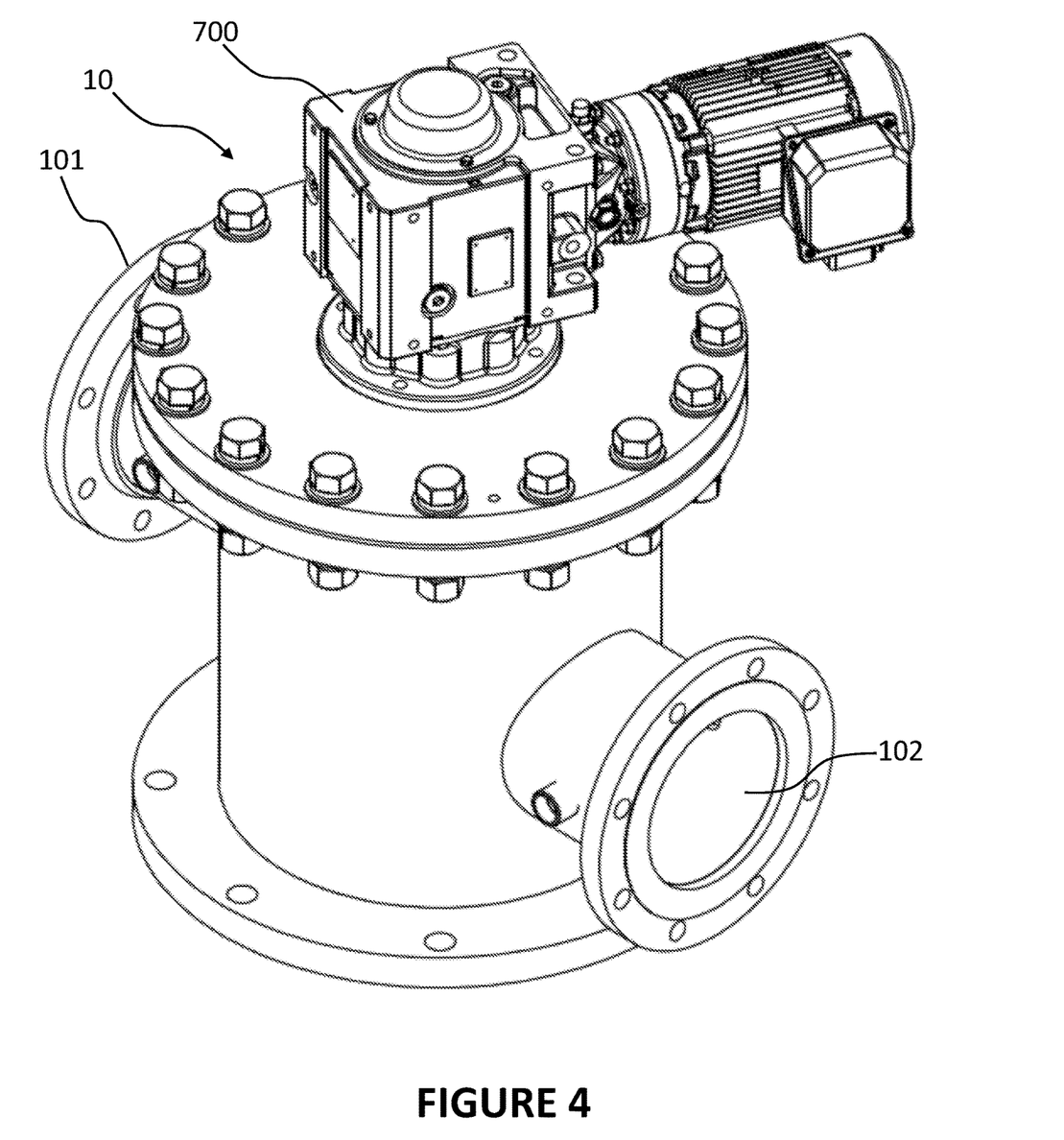
FIG. 4 is a perspective view illustrating an apparatus for solid material extraction according to an embodiment of the invention.

There is described below an apparatus 10 for wastewater treatment, broadly shown in FIG. 4, especially for the separation or filtration of solid materials in wastewater. The apparatus 10 comprises an outer casing, which can be a large cylinder, also referred to as a barrel 100. The barrel 100 comprises a wastewater input 101 for incoming wastewater, a filtered wastewater output 102 through which the wastewater with solid materials removed therefrom is outputted from the barrel, and a solid-material output 103 from which the filtered solid materials are outputted.

For greater clarity, the outputted solid materials forms a flow which is not completely solid, but rather a liquid flow containing most or all of the solid materials from the original wastewater. More precisely, the solid materials may be expected to form between about 1% and about 2% of the weight contents of the incoming flow of wastewater, while between about 8% and about 10% of the flow is outputted through the solid-material output 103. It implies that the outputted flow of solid materials flowing through the solid-material output 103 is not only solid, but also includes a significant liquid (water) content (about % of the output being therefore liquid). However, it includes a great fraction (most or almost all) of the solid materials in the incoming flow of wastewater, such that the only remaining solid materials not outputted through the solid-material output 103 are only a small or marginal quantity which can escape through the lateral perforations of the filtered wastewater output 102.

Indeed, to perform the step of separation between the solid materials and the wastewater, there are provided a basket 400 in the barrel 100, also referred to as a perforated screen (comprising perforations all around it), and a rotating screw 300 inside the basket which is actuated or propelled to push the solid materials downwardly (along with a portion of the liquid, as explained above), as received in the wastewater from the wastewater input 101, toward the solid-material output 103, while the filtered wastewater travelling through the perforations of the basket, across the thickness of the basket 400 from inside out, is free (thanks to the perforations of the perforated screen) to exit laterally into the filtered wastewater output 102, presumably for additional treatment.

The auger screw 300 reaching the bottom and comprising a wiper 320, and this opening connects to a pump for drawing wastewater; the pump 800 is controlled to match with a flow measured with flowmeter of incoming wastewater.

According to an embodiment, the apparatus 10 described herein in a closed, hermetically sealed apparatus. Contrarily to an open system, this can be used inside a building, e.g., for residential use, or in a mechanical room setting, without having bad smells spread into the building.

According to an embodiment, the apparatus described herein comprises a removeable core cartridge, this design allowing for quicker shaft seal replacement in the field. It Incorporates a housing for bearings and a shaft seal that comes installed on the upper decoupled shaft and which is removable from a remainder of the shaft for quick coupling and uncoupling without needing to reapply sealing compounds which require significant curing time and induce consequent downtime for maintenance. In other words, the auger shaft is decoupled so that there are upper and lower shaft sections which bolt together, allowing for the upper decoupled shaft to be installed into the removeable core cartridge with seal fully set prior to performing maintenance. Additional benefits to this design include better thrust resistance by incorporating tighter tolerances to keep the shaft vertical in operation, and higher seal pressure capabilities.

According to an embodiment, the screw 300 and the basket 400 inside the barrel 100 comprise a bottom arrangement, in which the basket is bottomless to be open from the bottom, providing free access from inside the basket to the area immediately under the basket. The bottom of the barrel which is immediately below the open bottom of the basket is a solid surface forming the bottom of the barrel, and comprises the solid-material output 103, formed as an opening in this solid surface forming the bottom of the barrel.

Figure 1:
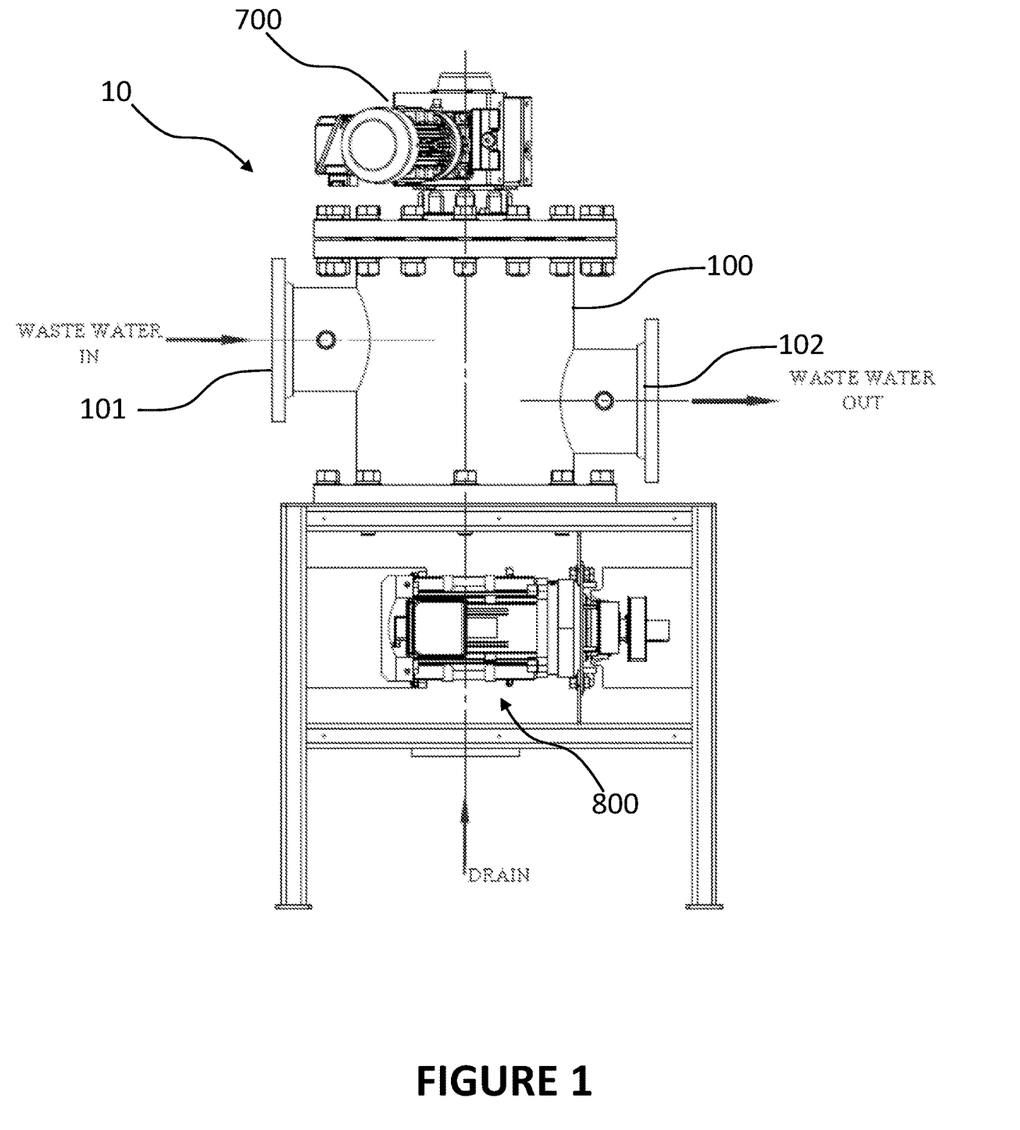
FIG. 1 is a front view illustrating a system for wastewater treatment comprising the apparatus for solid material extraction according to an embodiment of the invention.
Figure 2:
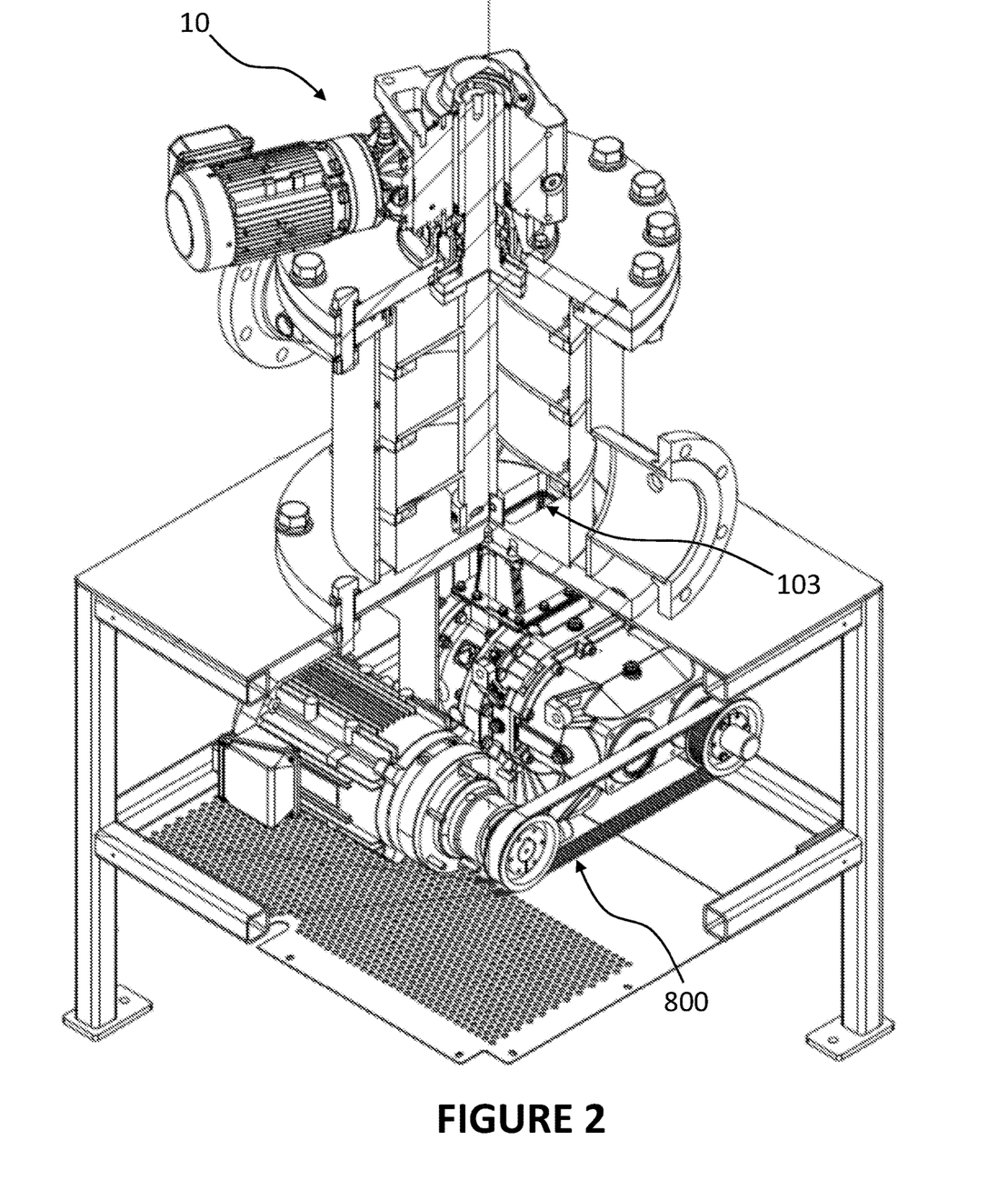
FIG. 2 is a perspective view illustrating a cross-section of the system for wastewater treatment comprising the apparatus for solid material extraction according to an embodiment of the invention.
Figure 7:
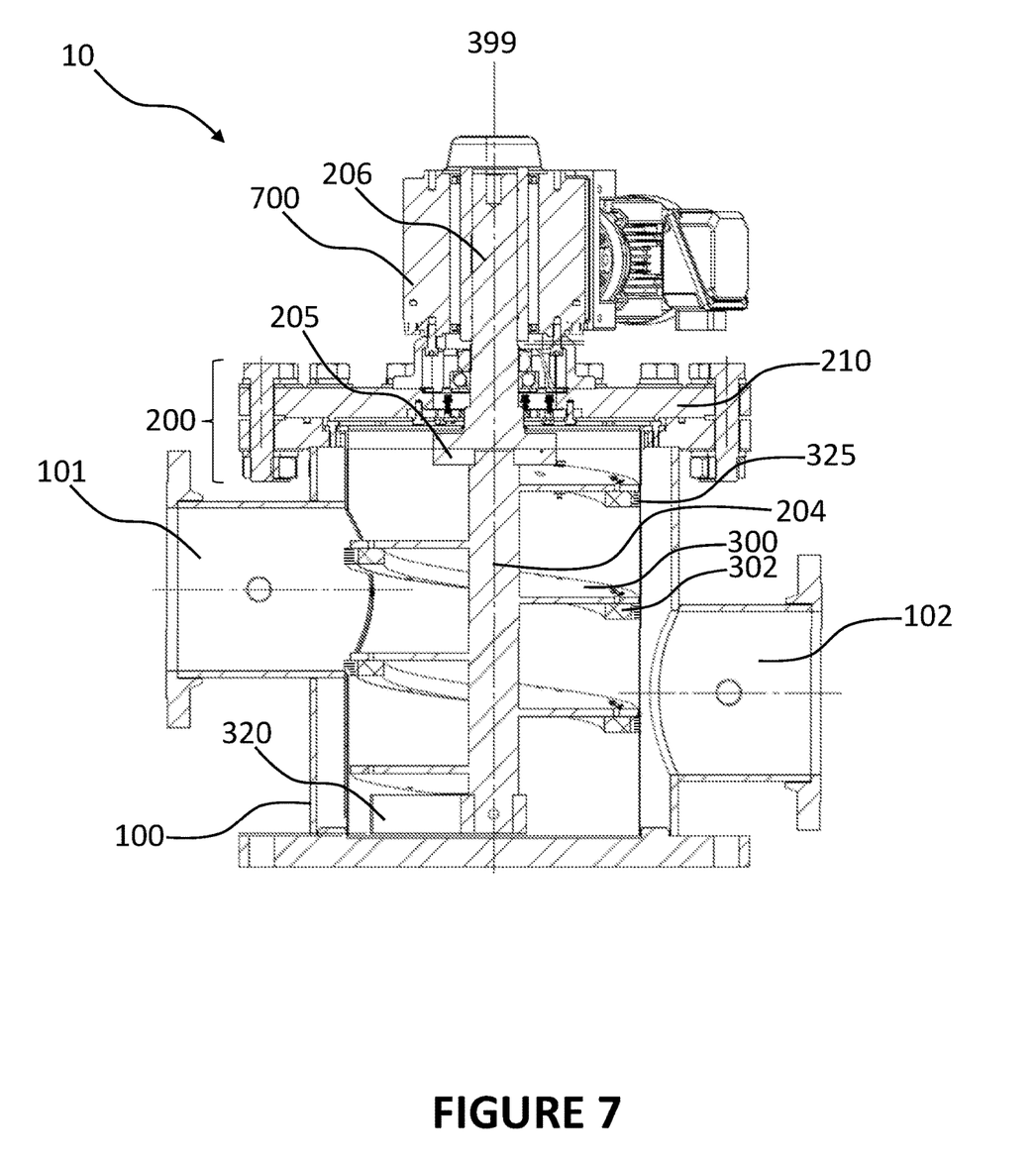
FIG. 7 is a cross section in a plane perpendicular to the cross section of FIG. 6 and illustrating an apparatus for solid material extraction according to an embodiment of the invention.

Prior art systems would normally comprise an output for solid materials that would be circular or similarly shaped (e.g., elliptical) and at the center of the solid surface forming the bottom of the barrel, i.e., aligned with the longitudinal axis of rotation of the screw and below it. According to an embodiment of the present disclosure, and as shown in FIG. 7, the auger screw 300 comprises a bottom winged wiper 320, which is operated in combination with a bottom surface of the assembly having a rectangular opening instead of a circular opening, the rectangular opening not being radially centered, but located closer to the periphery (edge) of the solid surface forming the bottom of the barrel. This rectangular opening for the solid-material output 103 is shown in FIG. 2.

Figure 6:
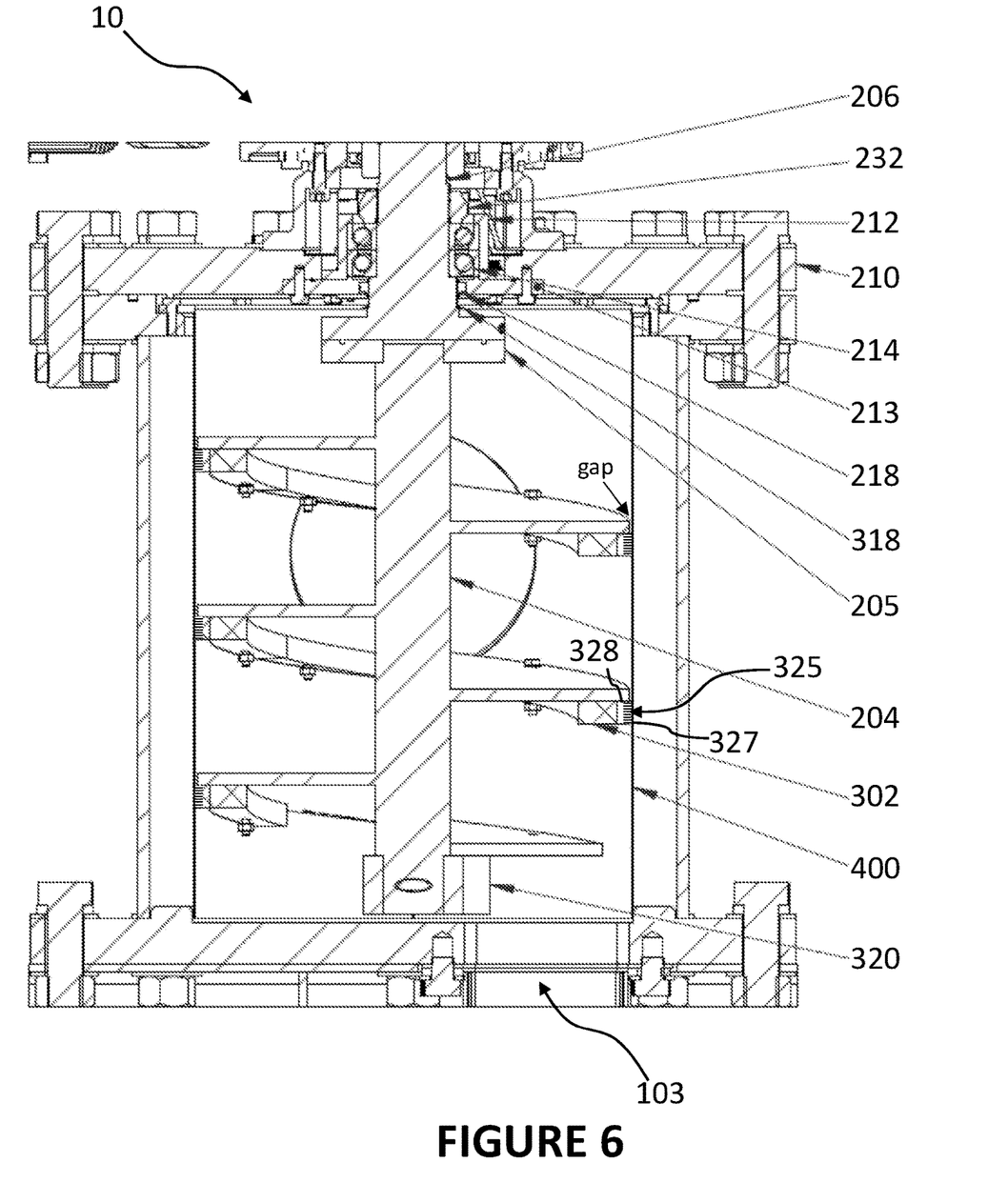
FIG. 6 is a cross section illustrating an apparatus for solid material extraction according to an embodiment of the invention.

According to an embodiment, and as shown in FIG. 6-7, there is provided a screw 300 inside the perforated screen. The screen is actuated to rotate (spin) around its central longitudinal axis of rotation which is the central longitudinal axis 399 of the cylindrical inside (housing) of the perforated screen (as shown, for example, in FIG. 7). The screw's outer dimensions should match the inside of the perforated screen 400, taking into account, as described in greater detail below, that there may be a brush 325 provided on the outer rim 302 of the screw 300.

Figure 5:
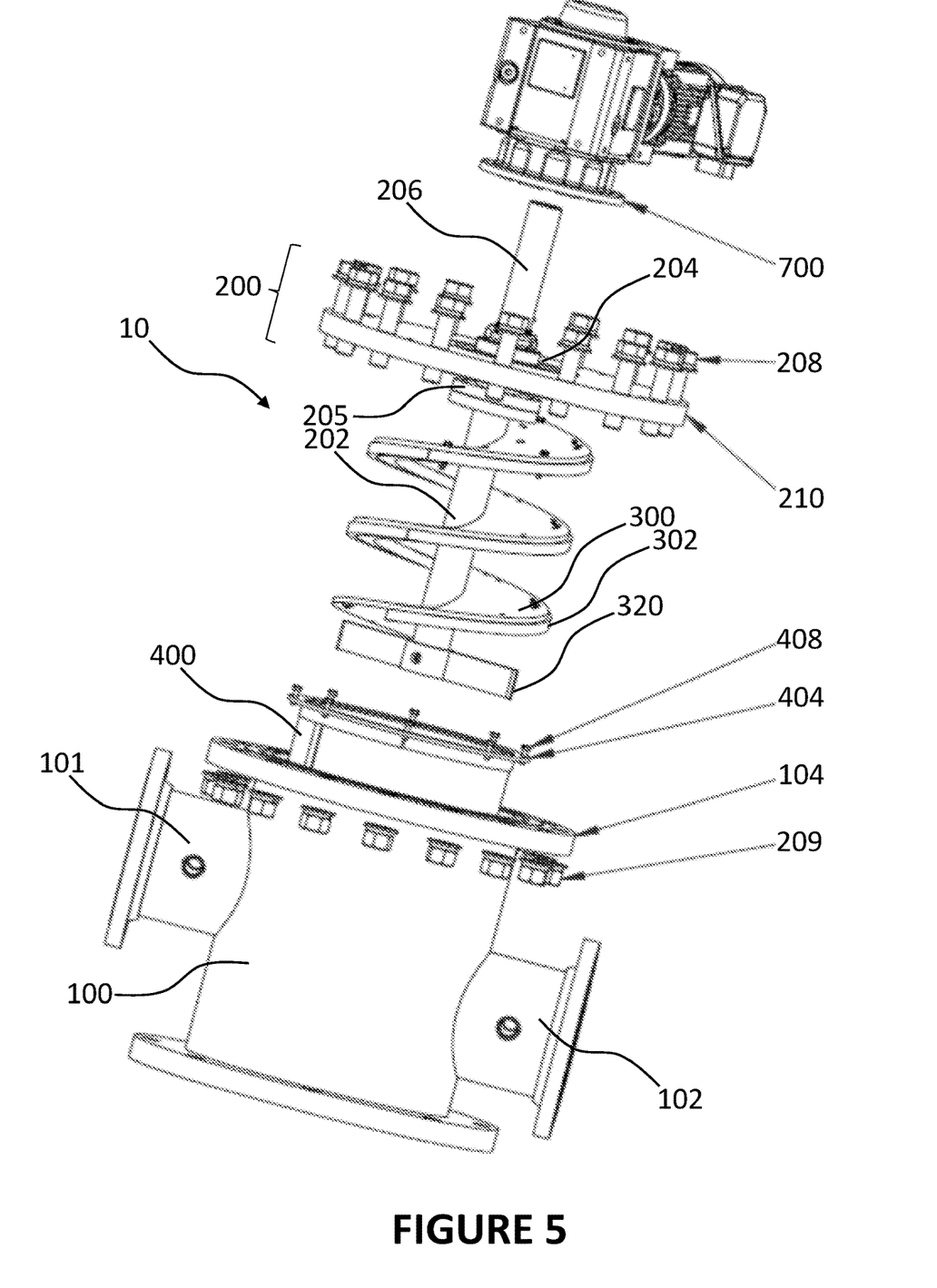
FIG. 5 is a side perspective exploded view illustrating an apparatus for solid material extraction according to an embodiment of the invention.

According to an embodiment, the screw 300 is an auger screw, as well shown in FIGS. 5-7 which illustrate the apparatus 10 in detail. According to an embodiment, the auger screw comprises a brush 325 on a helical periphery thereof. The helical periphery is the outer periphery formed by the radially external edge (outer rim 302) of the screw 300, which has a helical shape, or a similar shape formed by a point undergoing a circular movement simultaneous to an axial translation along the (longitudinal) axis of rotation 399 of the circular movement (shape of a helix). The helical shape can have a constant pitch, or a variable pitch along its longitudinal axis. As mentioned above, the radially external edge of the screw 300, or helical periphery, can also be referred to as an outer rim 302.

Referring to FIG. 6, the brush 325 provided on the radially external edge of the screw, or outer rim, can be a brush in the common sense, i.e., an object comprising a plurality of individual and independent bristles (i.e., distinct and separate from each other). Individual bristles 327 are shown within the brush 325 of FIGS. 6-7. Each bristle 327 is made of an elongated strand of appropriate material, such as a strand of a plastic material (e.g., nylon), having a root from a base 328 of the brush and extending away from the base, each bristle being adjacent to other neighboring bristles.

The brush 325 can comprise a base band 328 (rectangle base with a length which is much longer than the width) which is then installed and secured onto the external edge of the screw, or outer rim of the brush.

According to another embodiment, the brush 325 can be made with a base which has a generally helical shape which matches the helical outer rim of the brush, thereby ensuring an easier installation, avoiding deformation when securing the brush onto helical outer rim of the brush.

According to an embodiment, the brush 325 is installed with an interference fit to allow a forcing contact onto the screen's inner surface for the scrubbing capability to take advantage of a forced contact for greater scrubbing and scraping. In other words, the screw 300 has an outer diameter defined by the outer rim 302 thereof, the housing formed by the inner surface (inside) of the perforated screw 400 has an inner diameter, defining a gap as the difference between the housing's inner diameter the screw's outer diameter to accommodate the brush within said gap all around the screw installed in the housing. According to an embodiment, the brush has bristles extending radially away from the outer rim when installed thereon, defining a brush thickness (normal height of the bristles). The brush thickness needs to be at least equal to the gap. According to a preferred embodiment, the brush thickness at rest (when not compressed) is greater than the gap to ensure that the bristles are forced to deform and to bend when the screw is installed and slightly compressed in the housing to provide a forced contact (contact pressure at rest with the inner surface of the housing), making the brush slightly flared on the outside, which aids in providing a significant scrubbing action when the screw is actuated to spin thanks to the additional contact pressure and to the sweeping action of the bent or deformed brush bristles acting on the inner surface of the perforated screen when moving.

When the screw 300 is actuated and thereby spins within the housing in the perforated screen or basket 400, the brush 325 on the outer rim of the screw undergoes a spinning movement as the brush is made to contact outwardly the inner surface of the perforated screen. There is thereby performed a cleaning, by brushing, of the inner surface of the perforated screen, especially taking into account that the brush is in slight compression therein.

Hermetical systems which contain some form of device for scraping typically comprise a scrape, which is formed of a continuous band of material which is either rigid (e.g., an aluminum-bronze shearing edge) or reasonably flexible and which enters in contact with the corresponding surface immediately outside the screw. The brush, as described herein, is otherwise not used in prior art hermetical systems.

According to the present disclosure, it was found empirically that the brush is advantageous in that it is more effective than a typical continuous scrape for debris removal, i.e., debris are more effectively (in greater proportion, or in less time) removed from the closed space formed by the screw in the basket when a brush (according to the present disclosure) is used, instead of a continuous scrape as in the prior art.

According to the present disclosure, it was also found empirically that the effectiveness of the auger screw with a brush on the external edge is greater, especially taken with the bottom arrangement comprising a bottom winged wiper 320 in combination with a bottom surface of the assembly having a rectangular opening instead of a circular opening, the rectangular opening not being radially centered, but located closer to the periphery. Using the brush on the outer edge, with the bottom winged wiper 320 and the rectangular opening offset from the center (i.e., not in the central longitudinal axis 399) and by a periphery of the bottom surface of the barrel 100 ensures more efficient removal of solid residue from the basket, according to an empirical use of an apparatus according to the present disclosure, thus being advantageously easier to maintain and to operate for solid matter removal than prior-art systems, especially for closed, hermetically-sealed systems as contemplated herein. This configuration with the rectangular opening offset (away) from the center of the bottom surface ensures a full opening to direct solids towards the suction port of the pump 800 below.

The winged wiper 320, which can be a solid, rectangular wall having its surface extend upwardly, perpendicularly from the bottom, guides solids towards the extraction hole. The winged wiper 320 should have its bottom edge flush with the bottom surface of the barrel 100 along the length of said bottom edge, in such a way that it directs solids towards the suction port without areas of stagnation, such that and everything is directed towards the outlet 103, without being compressed, upon undergoing the sweeping motion of the winged wiper 320 across the bottom of the barrel.

According to an embodiment, the apparatus 10 is arranged to facilitate its maintenance and removal or replacement of central parts thereof, in particular the basket 400 and auger screw 300 therein.

In the prior art, it can be common to have to replace such parts. The top of the barrel can be removed to access the basket inside with the screw therein. The screw has a central shaft to actuate the screw. The central shaft at the longitudinal axis of rotation of the screw extends from the screw, upwardly, through the top cover of the barrel and extends above the top cover when an entrainment mechanism, or an engine or motor drives the rotating shaft to have the screw spin inside the housing within the basket.

When one of these parts needs to be changed, in particular the screw, the screw needs to be removed from the apparatus, along with its shaft which extends through the top cover, thereby dismembering the shaft from the top cover of the barrel through which it extends and in which it is normally secured using a cured sealing adhesive. The shaft would normally have been inserted through a central hole of the top cover and should have been secured in this position using a seal being applied and cured at the point of insertion. Dismembering the shaft from the top cover of the barrel should therefore imply breaking this seal.

Once the removal is done, the part replacement should involve installing a new or repaired screw with its shaft. Therefore, the operation of inserting the shaft through the central hole of the top cover, applying a seal all around the shaft at the point of insertion and curing the seal to make the connection waterproof (hermetic seal) and reinstalling the screw in the barrel and reconnecting the shaft with the motor should be performed again (still referring to maintenance in a prior-art apparatus). Curing time is about 24 hours before the seal is allowed to set and the top cover of the barrel with the shaft therethough can be reinstalled and used in the apparatus, resulting in significant downtime during this step of maintenance (dismembering of the parts secured together; reinstallation and 24-hour curing time for setting the sealing adhesive before restarting operation).

According to the present disclosure, there is provided an arrangement which significantly reduces downtime for replacing parts by having a central portion of the shaft already sealed and cured with a seal to avoid downtime due to curing time. More specifically, according to the present disclosure, the shaft is provided as a two-part shaft, comprising a lower or inner shaft portion 202 which is inside the barrel 100 and integrate with the screw 300, and an upper or outer shaft portion 206 which is outside the barrel 100 and which connects to the driving element or motor 700 which drives the rotation of the shaft. The two parts (202, 206) are distinct and separate and are to be releasably secured together for operation using a shaft connector 205 which can be separate from both shaft portions (202, 206) or integral with one of them (such as the upper or outer shaft portion 206, as shown). While it is more intuitive to have a shaft formed as a single piece, as in the prior art, it was found that forming a complete shaft with two distinct and separate parts to be connected together is, overall, lighter, cheaper and easier to manufacture because the parts are smaller. The releasable connection between them ensures that removal of the inner parts can be facilitated.

In particular, the apparatus 10 can comprise a cartridge 200, as shown in FIG. 5 and FIG. 7, which comprises the cover 210 for the barrel 100 and, within a central hole 204 in the cover 210, there is a shaft connector 205 which is secured therein, with the sealing adhesive 218 being already applied and cured. The shaft connector 205 is used to connect, on the upper side, the upper or outer shaft portion 206 and, on the lower side, the lower or inner shaft portion 202, thereby connecting both shaft portions (202, 206) to assemble them together into the complete shaft already sealed with the cover 210 of the barrel 100 which is roughly in the middle of the assembled shaft.

According to an embodiment, and as shown in FIG. 7, the shaft connector 205 can be integral with the upper or outer shaft portion 206, such that the upper or outer shaft portion 206 crosses the central hole 204 in the cover 210 and connects directly to the lower or inner shaft portion 202. However, the shaft connector 205 can also be separate from either the upper or outer shaft portion 206 or the lower or inner shaft portion 202, or it could also be integral with the lower or inner shaft portion 202 and releasably connect to the upper or outer shaft portion 206 instead. According to an embodiment, the connection between the shaft connector 205 (or connecting portion of a shaft portion) should releasably connect to at least one or the other shaft portion (202 or 206), and this releasable connection can be made by screwing them together, for example and without limitation.

The cartridge 200 is therefore an independent element which can be removed and reinstalled independently. When the apparatus 10 needs to have some inner parts removed or replaced, the cartridge 200 is removed. To do so, in addition to disconnecting the barrel's cover 210 from the barrel 100 by detaching the cover securing members 208 (which can be screws, bolts, pins or the like), the cartridge 200 can be simply disconnected from the lower or inner shaft portion 202. If the cartridge 200 is integral with the upper or outer shaft portion 206, the upper or outer shaft portion 206 is a part of the cartridge 200 and is disconnected from the motor 700. If the cartridge 200 is not integral with the upper or outer shaft portion 206, the upper or outer shaft portion 206 is not a part of the cartridge 200, and the cartridge 200 is removed by disconnecting it from both shaft portions (202, 206) and disconnected from barrel 100.

After that, the cartridge 200 is removed, the lower or inner shaft portion 202 (integral with or connected to the auger screw 300) and the upper or outer shaft portion 206 can be independently detached from the apparatus 10 and from the cartridge 200. A new part can be provided for replacement, or any one of them may be taken apart for cleaning or repair. In other words, by having a removable cartridge with the shaft connector 205 already sealed therein with the seal 318, detachable from at least one of the shaft portions (202, 206), and preferably detachable from the lower shat portion 202 which is connected to or integral with the screw 300, maintenance is greatly facilitated.

In the prior art system, the screw 300, or any portion of the unique single-part shaft, if in need to be replaced or repaired, would have needed to be detached from the cover into which it would have extended and to which it would have been sealed. It means dismembering the apparatus, performing the part replacement or repair, reinstalling all parts and re-applying the seal, to be cured for 24 hours, which is significant downtime.

According to the present disclosure, any portion such as the auger screw 300, the lower or inner shaft portion 202, and the upper or outer shaft portion 206 can be independently detached from the apparatus 10 simply by disconnecting the cartridge 200, which comprises detaching the cover 210 from the barrel 100 and disconnecting any releasable shaft portion (preferably 202 and possibly 206). Once the replacement or repair is performed, all parts are simply reassembled by reconnecting the shaft portion(s) (preferably 202 and possibly 206) to the shaft connector 205 which is still sealed to the inside central hole 204, and replacing the cover 210 of the cartridge 200 to attach it onto the barrel using the cover securing members 208. Therefore, the seal 218 never needs to be broken. Replacements of parts other than the shaft connector or shaft portion inside the central hole 204 itself do not require hampering the seal 218. If the cartridge 200 itself needs to be replaced, another new cartridge 200 can be provided immediately, already preassembled with the adhesive already cured, thereby avoiding any significant downtime.

Now referring to specific parts of the cartridge 200 and shaft portions (202, 206), the shaft connector 205 may (as already mentioned above) be integral with one of them, such as the upper shaft portion 206, or it can be distinct in an alternative embodiment. Referring more specifically to FIG. 6, there is provided, between the central hole 204 of the barrel's cover 210, a bearing assembly 214 which provides a way for the shaft to rotate within the central hole 204 of the barrel's cover 210. A bearing cage 212 surrounds the bearing to hold the berting arrangement 214 in place. A removable plate 213 can be used to be able to assemble and disassemble the bearing assembly 214 in the cover 210 with the shaft therein. A lock nut 232 is provided around the upper shaft portion 206 on the cover 210 to selectively lock it with the cartridge 200 or unlock it therefrom.

The motor 700 controls and drives the rotation (spinning) of the shaft made up of more than one (or at least two) shaft portions (202, 206). A controller controls the actuation of the motor 700, and the control can advantageously be performed in feedback to the monitoring of the solid material residues being outputted from the apparatus 10.

There is a difference in height between the piping of the inlet 101 and of the outlet 102. The center of the outlet 102 is located lower than the center of the inlet 101, inducing a downward flow inside the basket 400 in the barrel 100. This configuration also creates more usable filtering area on the basket screen (filter sleeve) within the barrel.

According to an embodiment of the disclosure, there is provided a controller which can control the rotation of the auger screw 300, including the speed of rotation, and the direction of the rotation. Advantageously, and further in view of improving maintenance, the motor 700 can be controlled to drive the shaft in reverse, which changes the direction of rotation in the basket 400 and aids in additional cleaning of the inner surface of the basket 400, when operated in maintenance mode. The reversal mode of the shaft including the auger screw 300 can be performed at set timed intervals, configurable from site to site, to improve the level of cleaning of the basket 400.

Similarly, according to an embodiment of the disclosure, there is provided a controller which can control the pump 800 to operate the pump 800 in reverse, which can perform additional cleaning to prevent clogging when performed occasionally.

Additional sensors can be provided for leak detection in the upper chamber between the barrel and the auger motor.

Now referring to the basket or screen 400, and as shown in FIG. 5, according to an embodiment of the disclosure, there is provided a rim 404 around the screen top flange for easy removal. This is provided with a tight fit near the top of the basket but becomes loose and easy to remove once it passes the top rim.

According to an embodiment of the disclosure, the screen flange has additional threaded holes, or push holes, that are not used for fastening but used to push through to lift the screen out of place during maintenance. Securing devices 408 can be use to secure the basket in the barrel 100, which can be screws (with corresponding threaded holes), pins, bolts or the like.

Also, according to an embodiment of the disclosure, there is provided screen reinforcement plate. The screen 400 is more solid without perforations on one side. The screen reinforcement plate reinforces the basket screen 400 and helps to direct water towards the outlet.

The apparatus 10 is especially appropriate for the context in which the apparatus 10 incorporates a feature of heat recovery from a waste stream, and comprising feedback controls in view of this particular context of use of the apparatus 10, as now described below.

Indeed, according to an embodiment, the filtration system or apparatus 10 incorporates a feature of heat recovery from a waste stream, which is provided by performing the steps of: providing a waste filtration system or apparatus 10 receiving incoming stream from the waste stream, and automatically and continuously controlling waste extraction to maintain waste content below a threshold suitable for heat exchanger use, a heat exchanger fluidically coupled to the waste filtration system for receiving outgoing filtered stream from the waste filtration system, and delivering a return cool stream back to the waste stream, a chiller heat pump fluidically coupled to the heat exchanger for receiving the warm stream and returning a cool stream, such that the coefficient of performance of the chiller heat pump is increased. An alternative embodiment of a system includes the substitution of a geothermal exchange for the chiller heat pump.

In other words, to provide the context of operation for the apparatus there is provided a waste filtration system receiving incoming stream from the waste stream, and automatically and continuously controlling waste extraction to maintain waste content below a threshold suitable for heat exchanger use. A heat exchanger is fluidically coupled to the waste filtration system for receiving outgoing filtered stream from the waste filtration system, and delivering a return cool stream back to the waste stream. A chiller heat pump is fluidically coupled to the heat exchanger for receiving the warm stream and returning a cool stream, such that the coefficient of performance of the chiller heat pump is increased.

According to an embodiment of the disclosure, the motor 700 is a variable-speed motor with frequency shift sensing that measures a load in the auger screw rotation correlated to the waste content level, allowing for precision feedback control. Most significantly the waste extractor is displacement type and applies controllable rate of extraction to reduce waste content level, while remaining sealable and able to extract large content.

Additional benefits of using a waste filtration system such as the apparatus 10, in comparison with existing solutions, include the control of displacement pump extraction rate by speed sensing of the auger, providing a closed processing loop for waste extraction and replacement. In comparison to alternate filter systems, the waste filtration system has self cleaning features to manage fibrous or large waste, enabling extended use before replacement of parts. Finally, significant performance improvement is provided to heat exchange systems from the recovered heat from a previously challenging to extract effectively from, source of continuous heat.

The apparatus 10, or filtration system, for waste processing and effective heat exchange, receives a fluid stream, processes, filters and separates the waste to reduce the viscosity and solid content of an outgoing filtered stream, while not effecting heat content of the waste stream, such that the filtered stream can be used for heat exchange or recovery.

Realizing benefits of such waste filter system has to overcome challenges of effectively separating waste then remixing it for closed loop, automated removal over a range of waste content, and self cleaning automation. As outlined earlier these challenges include, components that can operate under waste stream contraints, and feedback control that is reliable and effective.

In terms of general orientation and directional nomenclature, two types of frames of reference may be employed. First, as this description refers to screws, augers or screw compressors, it may be helpful to define an axial or z-direction, the axis 399, that direction being the direction of advance of filtered or separated material along the screw when turning, there being also a radial direction and a circumferential direction. Second, in other circumstances it may be appropriate to consider a Cartesian frame of reference. In this document, unless stated otherwise, the x-direction is the direction of flow of waste stream through the machine, and may typically be taken as the longitudinal centerline of the various feedstock flow conduits. The y-direction is taken as a horizontal axis perpendicular to the x-axis. The z-direction is generally the vertical axis of rotation (399). In general, and unless noted otherwise, the drawings may be taken as being generally in proportion and to scale.

The present embodiments are described using terms of definitions below:

"Filtration," as the term used herein, is the process of removing waste particulate, fibers and solids from a fluid.

"Waste stream", or "wastewater stream" as the term used herein, is a fluid containing waste particulate, fibers and solids, human waste. This may also be termed sewage waste or feedstock in waste separation, as the term used herein is to remove or reduce waste content from a waste stream, such that the filtered to a suitable viscosity level for further processing. In general, the embodiments apply to modest levels of waste typical in municipal sewage and not heavy sludge waste.

The housing or body of the barrel 100 may be formed of metal or plastic that meets pressure requirements (similar to sewage line pressure), and is formed to suitable tolerances for integrity of holding the filter sleeve or basket 400, and sealing the top and bottom endcaps. In the direction of flow of a incoming waste stream, fluid inlet port 8 is sealably couplable to an incoming conduit, and fluid outlet port 10 is sealably couplable to an outgoing conduit, receiving filtered stream 5. In the preferred embodiment these fluid ports and direction of flow are along the x-axis horizontally.

The inner chamber or enclosure of the barrel 100, holding the basket 400 within the inner volume of the enclosure, is preferably cylindrically shaped, to retain a correspondingly shaped cylindrical filter sleeve or basket 400 in this central region of the chamber. Preferably the chamber of the barrel 100 is hermetically sealed during operation. The filter sleeve 16 is perforated and could be formed as a perforated sheet or mesh, providing a similar filtering function.

As solids are retained within the sleeve, there is a need to further separate the solids for extraction, for which an auger or screw 300 is ideal for directionally urging or pushing solids along the screw axis. An auger screw 300 includes a volute (auger blades) and auger shaft, made up of multiple sections along its whole length, and is positioned within the filter sleeve or perforated basket 400 to help separate the solids by directing them downwards. The auger 300 may include a volute having a variable pitch spacing between the individual flights or turns of the volute, either as a constant step function as in the embodiment illustrated, or in an alternative embodiment having a continuously decreasing pitch spacing as the tip of the screw is approached in the distal, downward or z-direction. The auger screw 400 has an outer diameter corresponding to the inner diameter of sleeve or basket 400, such that the edge of the auger blades including the brush installed thereon and extending radially with an additional width are concentric with and in contact with the filter sleeve's perforated inner surface and scrape it when the auger is rotated. The sleeve and rotating auger together provide the core filtering of waste fluid, and a novel method of control of the rate of extracting this filtered waste is described that may require measurement of the waste content level of the fluid within the sleeve.

The auger shaft 21 extends out from the filter cup and is sealably couplable through drive port 14, to a motor 22, controllable to vary the auger rotation speed, and connected to a controller (shown in FIG. 6). Motor 22 may be a variable speed motor, and may include speed sensing, monitoring, and control apparatus operable continuously to vary output speed during operation. The variable speed motor 22 may be for example, types available from Sumitomo. Alternatively, motor 22 may be a geared motor, and may include a reduction gearbox.

The auger screw 300 is shown vertically extending from a drive port coupling to the motor 700, which can be a variable speed motor 22.

Figure 3:
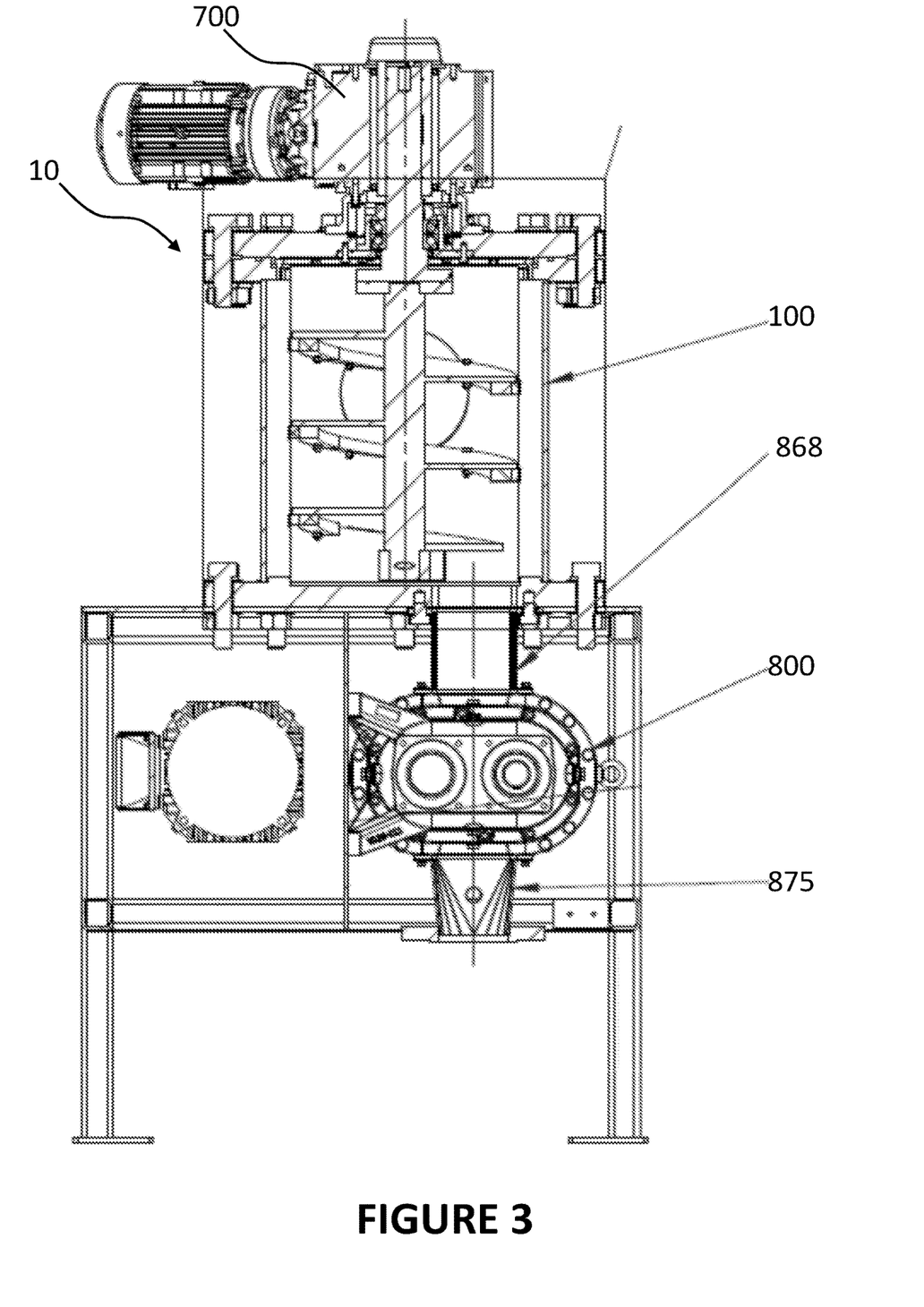
FIG. 3 is a cross-section of the system for wastewater treatment comprising the apparatus for solid material extraction according to an embodiment of the invention.

The port for solid-material output (103) is sealably couplable to a waste extractor or pump 800 outside the chamber, via a duct 868, and comprises a waste extractor output 875, as shown in FIG. 3. The waste extractor or pump 800 provides a controllable negative pressure or vacuum to extract waste from inside the filter sleeve through the bottom of the chamber. The waste extractor or pump 800 is connected to controller and thereby controllable to vary the rate of extraction. The waste extractor or pump 800 is selected from a preferred category of positive displacement pumps, such as those manufactured by Vogelusa.com™. This category includes lobe pumps, progressive cavity pumps, vane pumps and gear pumps. These pumps may include a extractor pump motor 23 for controlling the pump speed and vacuum. The waste extractor pump, provides various benefits to the filtration system, (in comparison to conventional pumps). Specifically for the preferred type of lobe pump, a first benefit is there is no varying fluid bypass with changes in pressure, hence, the pump has limited or no leakage while applying a vacuum to a low viscosity fluid. A second benefit is the pump allows large solids or waste to be removed and extracted without stopping operation to clean the pump, for example socks or clothing. A class of pump types provides an unusual and unexpected solution to the needs of the waste water processing, in particular for suitably sealing leaks of the fluid, extracting solid waste without much fluid, and passing through large solid waste objects.

The waste stream (such as sewage waste) typically has a particulate waste content of under 5%, and is ideally processed to provide a target content less than 5%, having a corresponding waste content level setpoint which is stored in controller 26. The waste content level is correlated to waste content by weight or volume, and can be determined by a wide range of sensors including pressure difference, turbidity, flow rate, and mechanical load. This is referred also as the "waste level". The waste content level of incoming waste stream, is variable and when it exceeds the setpoint is unusable and problematic for heat recovery use.

The waste filtration system or apparatus 10 can be coupled to a waste stream from municipal sewage, or local sewage storage or other forms of liquid waste. The filtration system operates as follows. The incoming waste stream enters the inner chamber 7 through fluid inlet port or input 101 under pressure, and flows through incoming side of the filter sleeve or basket 400 and around the auger screw 300 and out the regions of the sleeve or basket 400 not in contact with inlet port 8, flowing out through the fluid outlet port or output 102 as outgoing filtered wastewater stream. The rotating auger screw 300 separates solids, particulates from the fluid by urging the heavier solids downwards towards and out of the waste hole or wolid-material output 103. The faster the auger screw's speed, the more particulates are separated and the lower viscosity and waste content of the outgoing filtered stream. The auger screw's speed is preferably maintained at a constant rate from the driving motor 700, while the extraction is controlled by the waste extractor 800, hence some sort of control is preferable to ensure that they are operated consistently in view of the solid contents in the wastewater stream. In alternative embodiments, the auger screw's speed from the driving motor 700 and extraction speed from the pump 800 can be dependently varied to meet the target viscosity set point. Incoming streams with more waste content create greater load on the auger screw 300, which is measured by the built-in variable speed sensor of the motor 700, acting as a "waste level" load sensor. The separation is also facilitated by gravity acting on the solids and particulates. The most significant separation control is the rate of extraction by the waste extractor pump.

A feedback control method is provided to automatically maintain the outgoing filtered waste content below a setpoint stored by the controller. The preferred and simplest feedback control is to correlate the mechanical load on the auger by sensitive measurement of auger speed intrinsically measured and output by variable speed motor 22, to a waste content of the fluid within the filter sleeve 16. This is done by calibrating the filtration system 2 for measured waste content or viscosity and programming target set-points into the controller 26. When the load increases above a target set-point correlated to maximum waste level, the controller instructs the waste extractor or pump 800 to increase the extraction rate (increased vacuum or negative pressure), until the load measured on auger screw returns to below the setpoint (i.e. a measured shift in frequency of motor drive is correlated to a waste content level, and extraction rate increased until the frequency shift of the motor drive is reduced suitably). This feedback control quality makes the waste filtration system or apparatus 10 eminently suitable for use in applications requiring high reliability, limited servicing and closed loop automated filtration of varying characteristics of incoming waste streams. Specifically, applicants have achieved continuous feedback control and operation suitable for use in municipal scale commercial operations.

Such an apparatus 10 implements dynamic viscosity feedback control and continuous filtering of waste water maintains exit viscosity or "waste level" under a target setpoint, stable in use, maintains water clean and finally has suitable properties for reliable repeated use over long use cycles (years) common in continuous municipal or industrial heat extraction systems.

The apparatus 10 implementing feedback control is suitable for a waste filtration system integrated with heat exchange system.

Some heat exchange applications include a waste storage tank (typically coupled to the municipal sewage line), for example used in buildings for the purpose of temporary storage of waste, providing an additional source of waste stream having extractable heat. However, the waste filtration system can be configured to other arrangements including industrial waste or direct greywater recovery. For applications in sewage, the lobe type pumps are preferred.

This automated feedback control is further confirmed during heat recovery where the rate of heat recovery is shown to be independent of changes in waste content. The waste filtration system is preferably positioned vertically but is operable alternatively at an incline or horizontal at either slower removal rate or requiring increased rate of extraction by the pump. The waste filtration system extracts incoming waste for long periods continuously, with minimal reduction in flow rate. Therefore the waste filtration system is suitable to safely and efficiently process waste streams for heat recovery over a wide range of incoming waste stream conditions, enabling efficient heat recovery from waste water including for industrial or residential heating.

The waste filter system further allows for convenient fast and simple replacement of key consumable parts including the auger and filter screen, which is advantageous to maintaining high uptime and reliability. There are several benefits of the apparatus 10. Firstly, the control of displacement pump extraction rate by speed sensing of the auger. Secondly, providing a closed processing loop for waste extraction and replacement. Thirdly, in comparison to alternate filter systems, the waste filtration system has self cleaning features to manage fibrous or large waste, enabling extended use before replacement of parts. Fourthly, significant performance improvement is provided to heat exchange systems from the recovered heat from a previously challenging to extract effectively from, source of continuous heat.

The adaptive response of the system allows the stream to remain in closed loop while having heat extracted, such that separated waste is mixed back into the filtered stream to return for example to the municipal waste stream downstream.

The waste filtration system is found to continuously maintain the outgoing stream waste content within a range while the input stream rate and waste content varies. The separated waste is passively drained by gravity and assisted where needed by vacuum, suitable for reliable continuous automated use, while not requiring pre-filtering the incoming waste stream. The filter waste system is an unusual and fortunate discovery based on prototype testing of standard pump components leaking, heat recovery not possible as the stream was unsuitable for recirculation, and requiring heavy pre-filtering and manual removal of waste. Hence, the waste filtration system represents an ideal waste processing system for heat recovery suitable for wide range of incoming waste, automated operation, and less manual cleaning (or none) or stopping required.

Another benefit and novelty of using the waste filter in heat recovery is the process for feedback control is implemented in various sensor arrangements.

Alternate arrangements for waste extraction are known that can and are included herein as operable to filter waste water.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An apparatus for wastewater filtration, comprising:
   a barrel forming an enclosure and having an input for an incoming wastewater stream, and output for an outgoing filtered wastewater stream, and a solid-material output;
   a basket in barrel which is perforated and provided in the enclosure of the barrel, between the input and the output;
   a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion; and
   a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel.

2. The apparatus of claim 1, wherein the shaft connector is integral with the upper shaft portion.

3. The apparatus of claim 1, wherein the shaft connector is distinct from the upper shaft portion.

4. The apparatus of claim 1, wherein the screw is an auger screw.

5. The apparatus of claim 4, wherein the auger screw comprises a winged wiper at a bottom thereof for sweeping a bottom surface of the barrel.

6. The apparatus of claim 5, wherein the solid-material output is provided at the bottom surface of the barrel and is shaped as a rectangular opening which is offset from a central axis of the screw.

7. The apparatus of claim 4, wherein the auger screw comprises a brush on an outer rim thereof, the brush having radially outwardly oriented bristles that scrape an inner surface of the basket.

8. The apparatus of claim 1, wherein the basket comprises a flange on an upper rim thereof to ease a removal thereof from the barrel.

9. The apparatus of claim 1, wherein the input for the incoming wastewater stream is located higher than the output for the outgoing filtered wastewater stream.

10. An apparatus for wastewater filtration, comprising:
a barrel forming an enclosure and having an input for an incoming wastewater stream, and output for an outgoing filtered wastewater stream, and a solid-material output;
a basket in barrel which is perforated and provided in the enclosure of the barrel, between the input and the output;
a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion, the screw comprising a brush on an outer rim thereof, the brush having radially outwardly oriented bristles that scrape an inner surface of the basket; and
a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel.

11. The apparatus of claim 10, wherein the shaft connector is integral with the upper shaft portion.

12. The apparatus of claim 10, wherein the shaft connector is distinct from the upper shaft portion.

13. The apparatus of claim 10, wherein the screw comprises a winged wiper at a bottom thereof for sweeping a bottom surface of the barrel.

14. The apparatus of claim 13, wherein the solid-material output is provided at the bottom surface of the barrel and is shaped as a rectangular opening which is offset from a central axis of the screw.

15. The apparatus of claim 10, wherein the basket comprises a flange on an upper rim thereof to ease a removal thereof from the barrel.

16. The apparatus of claim 10, wherein the input for the incoming wastewater stream is located higher than the output for the outgoing filtered wastewater stream.

17. An apparatus for wastewater filtration, comprising:
a barrel forming an enclosure and having an input for an incoming wastewater stream, and output for an outgoing filtered wastewater stream, and a solid-material output;
a basket in barrel which is perforated and provided in the enclosure of the barrel, between the input and the output;
a screw which is rotatable within the basket to push solid material in the incoming wastewater stream into the solid-material output, the screw being rotatable by a shaft which is made up of at least two distinct shaft portions comprising an upper shaft portion and a lower shaft portion, the screw being mounted on the lower shaft portion, wherein the screw comprises a winged wiper at a bottom thereof for sweeping a bottom surface of the barrel; and
a cartridge comprising a cover for the barrel, the cartridge comprising a hole through which the shaft extends, the cartridge comprising a shaft connector which releasably connects to at least the upper shaft portion or the lower shaft portion to form the shaft, wherein the shaft connector is sealed within the cartridge and the cartridge is detachable from the barrel,
wherein the solid-material output is provided at the bottom surface of the barrel and is shaped as a rectangular opening which is offset from a central axis of the screw.

18. The apparatus of claim 17, wherein the shaft connector is integral with the upper shaft portion.

19. The apparatus of claim 17, wherein the shaft connector is distinct from the upper shaft portion.

20. The apparatus of claim 17, wherein the screw comprises a brush on an outer rim thereof, the brush having radially outwardly oriented bristles that scrape an inner surface of the basket.

21. The apparatus of claim 17, wherein the basket comprises a flange on an upper rim thereof to ease a removal thereof from the barrel.

22. The apparatus of claim 17, wherein the input for the incoming wastewater stream is located higher than the output for the outgoing filtered wastewater stream.

* * * * *